United States Patent [19]

Yamanouchi et al.

[11] Patent Number: 4,884,095
[45] Date of Patent: Nov. 28, 1989

[54] APPARATUS FOR WRITING A DATA ONTO PHOTOSENSITIVE FILM

[75] Inventors: Kenji Yamanouchi, Kokubunji; Yutaka Teraoka, Sagamihara; Makoto Ikeda, Hachioji; Masao Nakamura, Machida; Satoshi Kawai, Hino, all of Japan

[73] Assignee: Konica Corporation, Tokyo, Japan

[21] Appl. No.: 305,400

[22] Filed: Feb. 2, 1989

Related U.S. Application Data

[63] Continuation of Ser. No. 109,395, Oct. 19, 1987, Pat. No. 4,806,965.

[30] Foreign Application Priority Data

| Oct. 21, 1986 | [JP] | Japan | 61-248508 |
| Oct. 23, 1986 | [JP] | Japan | 61-250696 |
| Nov. 17, 1986 | [JP] | Japan | 61-271720 |
| Nov. 20, 1986 | [JP] | Japan | 61-275209 |
| Nov. 21, 1986 | [JP] | Japan | 61-276488 |

[51] Int. Cl.$^4$ .................................................. G03B 27/00
[52] U.S. Cl. ................................. 355/1; 346/107 R; 355/41
[58] Field of Search ............... 346/107 R; 362/32; 355/1, 41, 40; 350/96.1

[56] References Cited

U.S. PATENT DOCUMENTS

| 4,318,597 | 3/1982 | Kotani et al. | 355/1 X |
| 4,389,655 | 6/1983 | Baues | 355/1 X |
| 4,435,064 | 3/1984 | Tsukada et al. | 355/1 |
| 4,447,126 | 5/1984 | Heidrich et al. | 355/1 |
| 4,508,438 | 4/1985 | Kanaoka et al. | 355/40 X |
| 4,519,701 | 5/1985 | Kanaoka et al. | 355/40 X |
| 4,544,259 | 10/1985 | Kanaoka et al. | 355/40 X |
| 4,553,833 | 11/1985 | Kanaoka et al. | 355/40 |
| 4,577,926 | 3/1986 | Dewey et al. | 355/1 X |
| 4,728,981 | 3/1988 | Koek et al. | 355/1 |
| 4,806,965 | 2/1989 | Yamanouchi et al. | 355/1 |

FOREIGN PATENT DOCUMENTS 119422 7/1984 Japan.
19564 1/1985 Japan.

Primary Examiner—Richard A. Wintercorn
Attorney, Agent, or Firm—Finnegan, Henderson, Farabow, Garrett, & Dunner

[57] ABSTRACT

The invention provides an apparatus for optically writing a data onto a non-exposed film being coated with photosensitive material while moving the film to a predetermined direction. The data represents a film frame No., photosensitive emulsion lot No. and so on. The apparatus has two groups of LEDs being arranged with a pitch in parallel two lines being crossing at right angles to a film proceeding direction. The disposing position of LEDs on the one line differs by half of the pitch from that on another line. Therefore, the center of light spot on the one of spotted parallel line irradiated on the film does not face with that on another spotted line along the film proceeding direction. Further, the emission timings of the two groups of light emission sources are respectively controlled to have some time lag therebetween, thereby superposing partially the parallel two spotted lines.

3 Claims, 13 Drawing Sheets

| | | | | | | | | | | | |
|---|---|---|---|---|---|---|---|---|---|---|---|
| DATA LINE NO. → | 0 | 0 | 1 | 0 | 0 | 0 | 0 | 1 | 0 | 0 | 0 |
| | 0 | 0 | 1 | 0 | 0 | 0 | 1 | 1 | 0 | 0 | 0 |
| | 0 | 0 | 1 | 0 | 0 | 1 | 0 | 1 | 0 | 0 | 0 |
| | 0 | 0 | 1 | 0 | 1 | 0 | 0 | 1 | 0 | 0 | 0 |
| | 0 | 0 | 1 | 0 | 1 | 1 | 1 | 1 | 1 | 0 | 0 |
| | 0 | 0 | 1 | 0 | 0 | 0 | 0 | 1 | 0 | 0 | 0 |
| | 0 | 0 | 1 | 0 | 0 | 0 | 0 | 1 | 0 | 0 | 0 |

⟶ ADDRESS

APPARATUS FOR WRITING A DATA ONTO PHOTOSENSITIVE FILM

This is a continuation of application Ser. No. 109,295, filed Oct. 19, 1987 now U.S. Pat. No. 4,806,965, issued Feb. 21. 1987.

BACKGROUND OF THE INVENTION

The present invention relates to a data writing apparatus for optically writing the number of film frames, brand, emulsion lot number, bar code, characters, and symbols (hereinafter referred to as the data) onto the non-exposed film thereon in the course of the production process of the roll film to be used for cameras, and further relates to an apparatus wherein an improvement has been implemented with respect to the datareading process which is so designed as to read out the data from a memory storing the writing data.

This type of apparatus is so designed as to perform the data writing function as feeding the film at a given velocity after slitting the non-exposed film into strips having a given width, wherein the non-exposed film have been applied thereon with the photosensitive materials and have been processed to form perforations as feeding holes.

As for the conventional data writing apparatus as described above, there has been known an apparatus wherein there is provided an exposure means for writing symbols having different colors along the film proceeding path. Another example of this type is an apparatus disclosed in the Japanese Patent Publication NO. 19564/1985 wherein there are provided dot light projectors consisting of plural guiding members for guiding respective different color light of each LED or the like for optically writing the dots. In the dot light projectors, light-outgoing ends of the optical members are bundled so as to cause the color distribution therefrom to be uniform. A plurality of the dot light projectors are so arranged in a line that the light therefrom can be collected by means of a lens and then be irradiated onto the film.

The former has a disadvantage that only those colors and symbols present in the range limited by the number of the exposure means can be written. The latter, on the other hand, has the following disadvantages: First, the LEDs to be used are required in number equivalent to the value obtained by means of multiplying the number of LED types by the number of the dot light projectors, thus numerous number of LEDs are necessary. Second, when such numerous number of LEDs are used, the area of the dot light projectors becomes great in scale, because the dot light projectors are formed by means of bundling the light-outgoing end of the optical guide members, thus it becomes difficult to write such data s including fine dots and lines. Third, even though apparently the written dots may seem to have a uniform color pattern for human eyes, those dots are actually composed of a distribution of different color stops. Moreover, in the case of writing seven colors by means of turning on all three LEDs, for exmaple, blue (B), green (G), and red (R), or by means of turning on two lights out of them, or by means of turning on only one light out of them, the distribution density of the color spots of the dots becomes uneven, except in the case all three lights are turned on, thus resulting in the possibility to cause the false information when reading the data which can be interpreted in various ways.

In addition, as for the data writing apparatus using the dot system other than those described above, there has been known an apparatus, as disclosed in the Japanese Patent Publication No. 119422/1984, wherein a multiplicity of light projectors to be used for performing small circular exposures with respect to the film, are so arranged as to be positioned in a line in the direction being right angle to the film proceeding direction so that each small circular exposure areas are juxtaposed, and by means of relating those light projectors with the movement of the film so as to allow the light projectors to selectively light, thus the data such as characters and figures composed of dots can be written in the film; however, according to this apparatus, the color of the data cannot be changed.

Furthermore, since the data having the dot construction to be written by the conventional data writing apparatus as mentioned above, are composed of the small circular dots in matrix arrangements consisting of the proceeding direction of the film as well as the direction being right angle to the film proceeding direction, or in a matrix arrangement some of whose dots are removed from the above matrix arrangement, consequently, a vacant space is generated between the dot arrangements. Thus, in the case of optically reading the data of the bar code which shows the printing conditions of the film, there has been a problem that no accurate information has been obtained, because the density level of the bar portion of the bar code varies t a great extent due to the vacant portion or the non-exposed portion present between the dots.

Further, when writing the data using the conventional data writing apparatus as described above, the data to be written had been stored beforehand in the memory with the dot information as well as the film position information, and the position signals occurring in synchronization with the film feeding action are detected, and then the information read out from the memory using the CPU with a complex processing program are written.

In other words, in the conventional data writing apparatus, the CPU and such complex processing program are indispensable factors, thus requiring quite a long time from detecting the film position to the writing operation, which acted as an impeding factor for increasing the film feeding velocity as well as enhancing the dot density. Also, there was an additional problem that if there was an irregularity in the film feeding velocity, the data writing position could not come at the correct position.

SUMMARY OF THE INVENTION

The present invention is developed to solve the abovedescribed disadvantages, and its object is to provide a data writing apparatus whereby the data composed of dots can be written in the manner that is free from a vacant portion between the dots arrangements.

The present invention provides a data writing apparatus comprising a film feeding means, a detection means for the film feeding travel, an exposure means comprising a multiplicty of light projectors which irradiate light in such a manner that the irradiated portions make small circular areas so arranged as to be juxtaposed one another in the direction being right angle to the film proceeding direction, and a control device so designed as to allow the exposure means to from the data such as characters, figures, and so on to be written on the film by means of letting the aforementioned multiplicity of light projectors selectively emit light based on the output signal of the aforementioned detection means; the data writing apparatus being characterized in that the exposure means is comprised of a multiplicity of light projectors which irradiate light in such a manner that the irradiated portions form at least two juxtaposed parallel lines in the direction being right angle to the film proceeding direction and the lines are so arranged that the positions of the irradiated portions of respective lines do not face with each other in the film proceeding direction, and that the exposure means is so designed as to be controlled by the control device mentioned above in such a manner that a multiplicity of light projectors are allowed to selectively emit light with respect to the arrangement positions of the above-mentioned lines, thus the object of the present invention is achieved.

Also, the present invention is intended to provide a data writing apparatus wherein not only such data having uniform and different colors but also such data including fine lines and dots, can be written in the color film by means of an exposure means which employs LEDs as many as the number identical to that of the dot light projectors.

To obtain the object as described above, in the data writing apparatus according to the present invention comprising a film feeding means, a detection means for the film feeding travel, an exposure means for writing a data such as characters and figures, and a control device so designed as to allow the exposure means to permit the above-mentioned data to bwe written on the film based on the output signal of the aforementioned detection means, the exposure means is so constructed as to employ as its light source a plurality of LEDs capable of emitting a plurality of color light and the control device is so designed as to perform the control function of not only the quantity of designated color light to be emitted from each LED but also of the switching on/off of each LED.

Further, the additional object of the present invention is to enhance the film feeding velociy as well as increasing the density of dots by means of eliminating the necessities of using the CPU and the complicated processing prografm for performing the writing function, and to minimize the influence, if any of the irregularity of the film feeding velocity.

Accordingly, the data writing apparatus according to the present invention for optically writing the data onto the non-exposed film is so constructed as to comprise a memory wherein the data to be written on the data writing lines extending from the starting portion to the end portion of a predetermined length of film are entirely stored by means of a data input system, and then each data is sequentially read out from the above-mentioned memory in synchronization with the film feeding velocity.

DETAILED DESCRIPTION OF THE INVENTION

Figure 1:
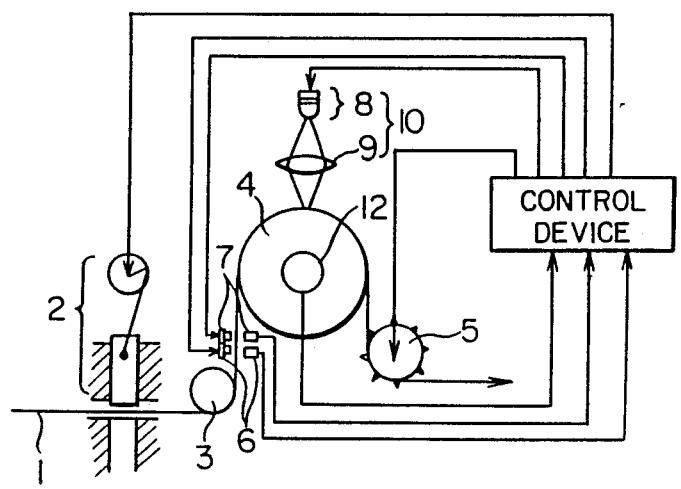
FIG. 1 is a structural illustration of a data writing apparatus for optically writing data onto a roll film according to the invention.

In the data writing apparatus as shown in FIG. 1, a roll film 1 is fed from the feeder positioned in the left side (not illustrated), and then is guided by means of guide rollers 3 and 4 through a notch cutter 2, and finally is taken up by means of a take-up means positioned in the right side (not illustrated) through a rotating feed roller 5 which is equipped with sprocket teeth to mesh with perforations and is controlled by the control device.

The notch cutter 2 is controlled and operated by means of the control device, and is so designed as to provide the film 1 with notches at one side end of the film whenever the film 1 is fed to the travel corresponding to the predetermined number of frames.

There are provided a notch detector 6 and a perforation detector 7 between the guide rollers 3 and 4; the notch detector 6 controlled by the controlling device comprises a light emitting device having the capability to emit light such as the infrared light which does not cause the film to be sensitized and a light receiving device having the capability to detect the light from the aforementioned light emitting device. The notch detector 6 detects notches formed by the notch cutter 2 and the outputs the detection signals to the control device; the perforation detector 7 detects the perforations and outputs the detection signals to the control device.

At the position confronting the surface whereon the film 1 is guided by the guide roller 4, there is provided an exposure means 10 comprising a light source 8 and a lens 9 for collecting the light from a light source 8 in order to form an image on the surface of the film 1 positioned on the guide roller 4. The light source 8 of the exposure means 10, as shown in FIG. 2, consists of a plurality of multi-color LEDs 11 capable of independently emitting a pulurality of color lights which are so arranged in the direction as to be right angle to the proceeding direction of the film 1.

If the film 1 proceeds under the condition wherein the LEDs 11 of the light source 8 are controlled by the control device in such a manner that the LEDs keep lighting, or flickering at the cycle shorter than the time obtained by dividing the projected light spot width in the film proceeding direction by the film proceeding speed, then a fine line is written on the film 1, and provided that the number of the LEDs 11 in such statuses as described above increases, the number and thickness of such lines will increase.

If the film 1 proceeds under the condition wherein the LEDs 11 of the light source 8 are controlled by the control device in such a manner that the LEDs momentarily light, then a dot corresponding to the projected light spot is written on the film 1, and provided that the number of the LEDs 11 arranged in the direction crossing at right angles to the film proceeding direction increases, the number of dots arranged in the direction being right angle to the film proceeding direction will increase, or the dots can be arranged to become one line. Thus, any desired data such as characters and figures can be written in the film 1.

Figure 2:
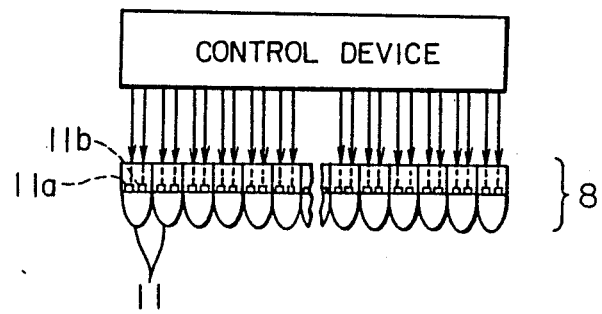
FIG. 2 is a schematic diagram showing an embodiment of light emission sources of an exposure, means, FIGS. 3 through 5 indicate another emodiments of the exposure means showing arrangements of a light emission source and an optical fiber.
Figure 3A:
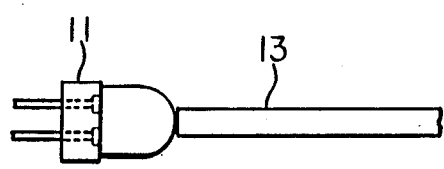
Figure 3B:
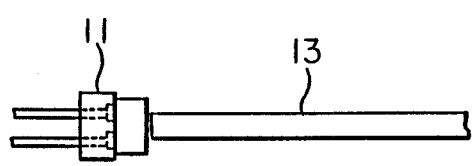
Figure 3C:
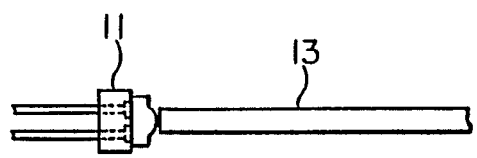
Figure 3D:
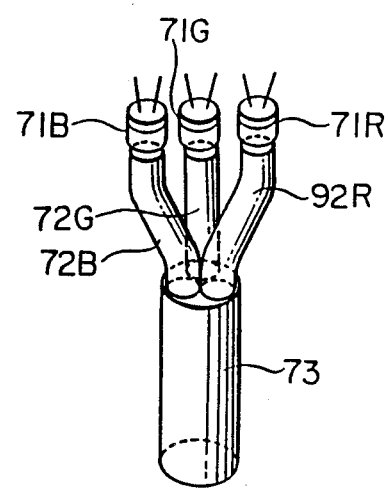

The above-described lighting control of the LEDs 11 is, as shown in FIG. 2, carried out independently for each color light emitting element, 11a and 11b. Accordingly, for example, when there are two color emitting elements, 11a and 11b, as for one kind of data, the color emitting elements 11a and 11b are simultaneously turned on, as for other kind of data, either one of the color light emitting elements 11a or 11b is turned on and rest one of emitting 11b or 11a is not turned on, and as for the data other than described above, another one of the color light emitting element 11b or 11a is turned on and other rest one of color emitting element 11a or 11b is not turned on, thus three kinds of colors can be written in the film.

Further, if the light amount control function of the color light emitting elements 11a and 11b are so constructed as to be controlled mutiple stepwise or continuously in addition to the two-step control of turning on/off of the light emitting elements as described above, then, of course, the variety of colors capable of being written will increase accordingly.

The control device is inputted the pulse outputted from an encoder 12 mounted on the guide roller 4 in proportion to the roceeding travel of the films 1, and counts the output pulse of the encoder 12 upon receipt of the perforation detection signals after receiving the notch detection signals, then the light source 8 is actuated in such a manner as described above based on the condition that the conted value of the output pulse reaches the specified value, thus the data is written on the film 1 by means of the exposure means 10. The procedure described above will be repeated whenever the aforementioned output pulse reaches the value obtained by adding the number of pulses equivalent to the film proceeding travel corresponding to a film frame to the above specified value.

When the number of repetition reaches the specified number of film frames, the next notch detection signal is inputted, and then the data will be written on the film according to the pulse count started upon receipt of perforation detection signals after the notch detection signals have been inputted, whereby even if the notch position is slightly deviated from the proper position, the data can be written on the film at the specified position thereof.

Figure 4:
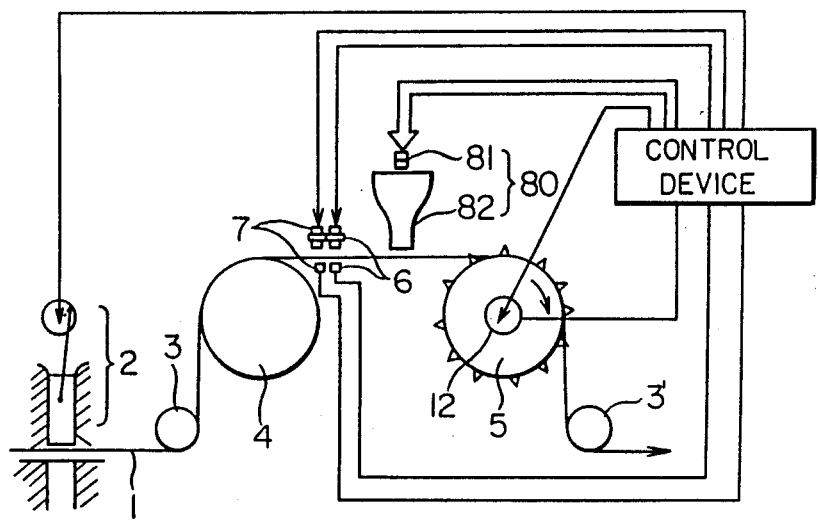
Figure 5:
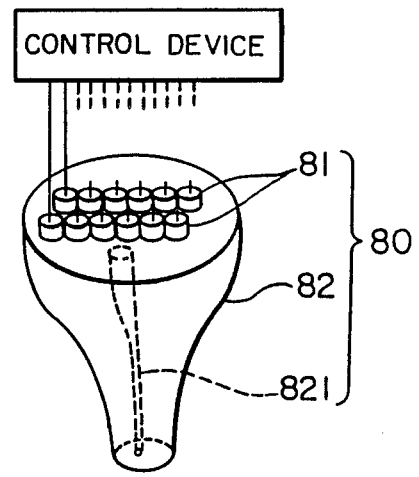

The exposure means 10 is, as shown in FIGS. 3-a through 3-c, so designed as to guide the light emitted from the multi-color LEDs 11 through the optical guide member, or an optical fiber 13 to the film 1. In this case, only the light-outgoing end of the optical fiber 13 is required to be regularly arranged in the direction being right angle to the film proceeding direction; the multi-color LEDs 11 are not required to be regularly arranged. Further, in this case, if the configuration of the light-outgoing end portion of the multi-color LED 11 is, as shown in FIG. 4, so designed as to come in close proximity to the light-incoming end portion of the optical fiber 13, or, as shown in FIG. 5, so designed as to form in the shape of a lens which collects and let the light go into the light-incoming end portion of the optical fiber 13, then the light incoming efficiency with respect to the optical fiber 13 from the multi-color LED 11 will be enhanced, thus allowing the data to be efficiently written in the film.

The following description deals with an embodiment of a mixed-color light source using a plurality of single color LEDs, each of which is so designed as to emit a different color from others.

In FIG. 3-d, 71B, 71G, and 71R are LEDs which emits, for exmaple, the blue light, green light, and red light, respectively; 72B, 72G, and 72R are light guides made of the material such as an opticla fiber which guide the light emitted from the LEDs 71B, 71G, and 71R, respectively; 73 is a light guide used for mixing the light which is mounted in such a manner that the light-incoming end face thereof contacts the light-outgoing end faces of the light guides 72B, 72G, and 72R.

The light-incoming efficiency of the light emitted from the LEDs 71B, 71G, and 71R and coming into the light guides 72B, 72G, and 72R, can be enhanced by employing such means as that the light-outgoing faces of the LEDs 71B, 71G, and 71R are so formed as to be flat so that the light-incoming faces of the light guides 72B, 72G, and 72R may come sufficiently near thereto, or as to be the lens surface to collect the light in such a manner as to let the light come into the light guides 72B, 72G, and 72R.

Also, as shown in FIG. 3-d, if the light guides 72B, 72G, and 72R are so arranged that the light-outgoing end faces thereof can contact the inner side of the light-incoming end face of the light guide 73, then most of the light guided by the light guides 72B, 72G, and 72R can come into the light guide 73. In the next stage, the light coming into the light guide 73 is mixed, and then goes out from the entire area of the light-outgoing end face of the light guide 73 in the form of the uniformly mixed light.

Accordingly, a uniform color dot can be written on he surface of the color film, if the light-outgoing end face of the light guide 73 is so arranged as to come near to the surface of the color film, or if the lens can collect the light in such a manner as to form an image on the surface of the color film. THe color of the dot can be easily altered by means of independently changing the light-emitting intensity of the LEDs 71B, 71G, and 71R.

Even if a part of the LEDs 71B, 71G, and 71R stops emitting light and the color is changed accordingly, the color of the dot remains uniform and the size of the dot is not altered. Therefore, even if a plurality of such type of light projectors are used to write the data composed of the dots, and such data is mechanically read out, the correct information can be obtained.

Additionally, the light projector according to the present embodiment has many advantages, wherein each light emitting portion is provided with the light guide, thus assuring the light-incoming efficiency of the light from each light emitting portion coming into the light guide can be maintained at the high level; moreover, by means of so arranging the light-outgoing end faces of the light guides as to confront the light-incoming end face of the light guide used for mixing the light, the light from each light emitting source can efficiently come into the light-mixing light guide to be well mixed therein, whereby the dot can be written in a uniform color by the light having a uniform color which is sufficiently irradiated from the light-outgoing end face of the light-mixing light guide; the light guide corresponding to each light emitting source should not be necessarily composed of the multifiber, that is, the multifiber having fibers less in number can be also used, thus not only allowing the light guide having a small sectional area to be used for mixing the light, but also allowing the replacement work of the light guide corresponding to each light projector to be carried out by means of relacing the broken one only; furthermore, the color to be written onto the surface of the film can be easily altered by means of independently controlling the amount of the light to be emitted from the plurality of the light emitting portions.

Figure 11:
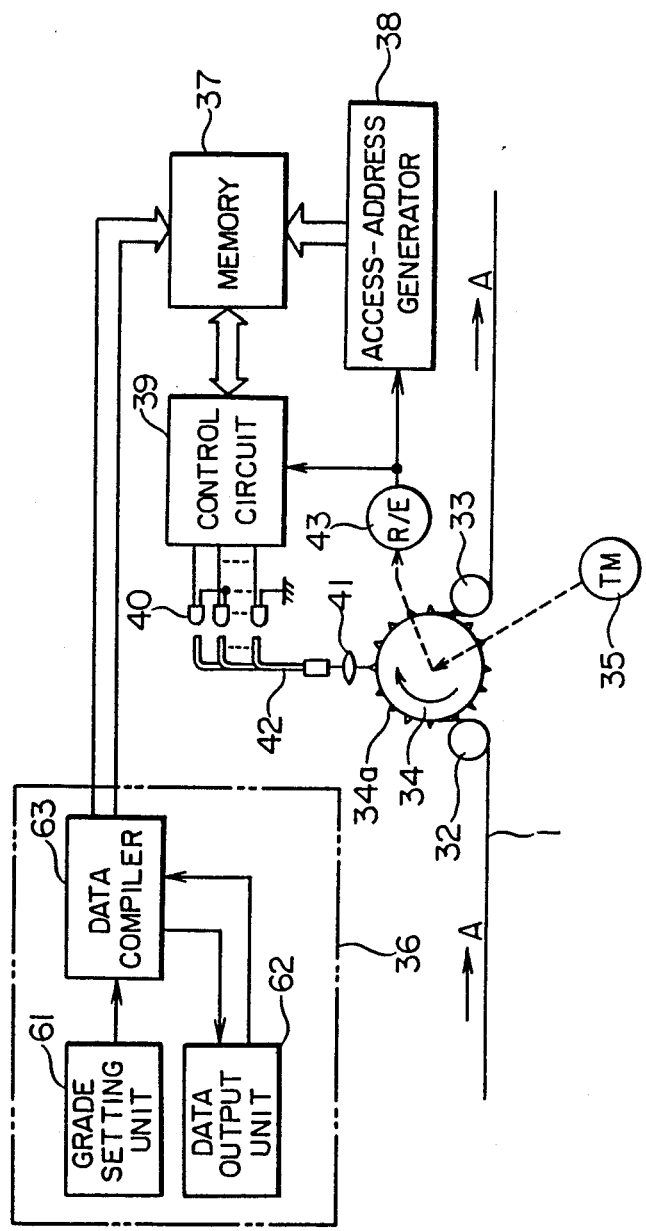
FIG. 11 is a schematic diagram showing a control device for controlling data to be optically written onto a roll film in a data writing apparatus according to the invention, FIG. 12 illustrate a characteristic curve of torque motor incorporated, in FIG. 11, FIG. 13-a is an explanatory diagram showing one example of dot construction of data "14" written on a roll film, FIG. 13-b is an explanatory diagram showing one example of data stored in a memory to form the dot construction as shown in FIG. 13-a.

In the embodiment as described above, a plurality of LEDs are employed as the light source, and, as shown in FIG. 1, the image formed by means of arranging the LEDs, or, as shown in FIG. 11, the image formed by means of arranging the light-outgoing end face of the light guide for guiding the light emitted from the LEDs, is so projected through the lens as to reduce the image in size.

According to the method as described above wherein an image is so projected through the lens as to be reduced in size, the light utilization efficiency with respect to the range from the image surface to the image projection surface depends on the F number of the lens; therefore, in order to enchance the utilization efficiency, the F value has to be decreased, however, on the other hand, making the F value extremely small causes the difficulty of manufacturing such a lens as well as the depth of field to be reduced, thus using the lens having the small F value has its own limit, and therefore deteriorating the light utilization efficiency.

In particular, in the case of using the LEDs as the light source, the light intensity of the LEDs is low, thus the exposure light amount becomes short, resulting in that the dot cannot be always written in the film with a sufficient density.

The inventors of the present invention have made research to solve the disadvantages as described above, and have discovered that they can be solved, for exmaple, by means of enhancing the light utilization efficiency with the aid of the tapered image guide as an exposure optical system which is provided by the Scientific Instruments Corp. U.S.A.

The exposure means 80 of the data writing apparatus as shown in FIG. 4 having the similar construction as shown in FIG. 1, employs the LEDs 81 which are so arranged as to be positioned in the direction eing right angle with respect to the proceeding direction of the film 1 as the light source, wherein the light emitted from the LED 81 and received by the tapered image guide 82 is irradiated onto the surface of the film 1.

The tapered image guide 82 is comprised of the bunch of the construction image guide 821 whose longitudinal cross sectional configuration is similar to that of the tapered image guide 82, whereby the light emitted by the LED 81 is very efficiently irradiated onto the surface of the film 1.

Accordingly, if the LEDs 81 are so arranged as to allow their light to irradiate very efficiently into the tapered image guide 82, then the data composed of dots having a sufficient density can be written on the surface of the film 1 with the high efficiency of the light. In other words, each data writing process as described above according to the present exposure means 80, is carried out by the control device in such a manner as that the LEDs 81 are allowed to selectively emit light in relation to the movement of the film 1.

The embodiment wherein the tapered image guide is employed is not limited to the one only as described above; but, for exmaple, the exposure means 80 may be constructed as to perform the exposure process by means of using the light which is emitted rom the light source such as a strobe light controlled by the control device, the light then comes into the tapered image guide 82 through a mask equipped with a light-passing portion shaped to the data configuration, then the film is exposed to the light thus obtained.

Also, a converging lens may be employed at the light-incoming side or light-outgoig side of the tapered image guide 82. In that case also, compared with the case wherein instead of the tapered image guide, only a lens is used to project the reduced image, the light utilization efficiency can be much more enhanced by means of employing a lens having the larger F value.

The tapered image guide should be preferably used, as shown in the figure, in the way of projecting the reduced image, wherein the end face having the larger area is used as the light-incoming face and the end face having the smaller area is used as the light-outgoing face; because, by means of using such an arrangement, the light-incoming efficiency of the light coming from the light source such as the LEDs 81 can be easily enhanced; however, the tapered image guide may be also used in the way of projecting the enlarged image.

The following description deals with the embodiment regarding the arrangement of the LED according to the present invention.

Figure 6:
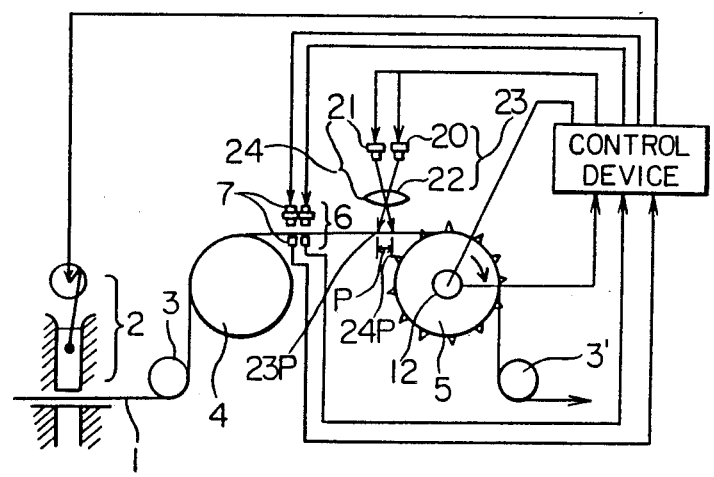
FIGS. 6 and 7 are structural illustration respectively showing another embodiments of data writing apparatus for optically writing data onto a roll film according to the invention.

FIG. 6 shows an embodiment obtained by means of partially modifying the embodiment shown in FIG. 1, wherein the member having the identical number has the same function as that as shown in FIG. 1.

Figure 8:
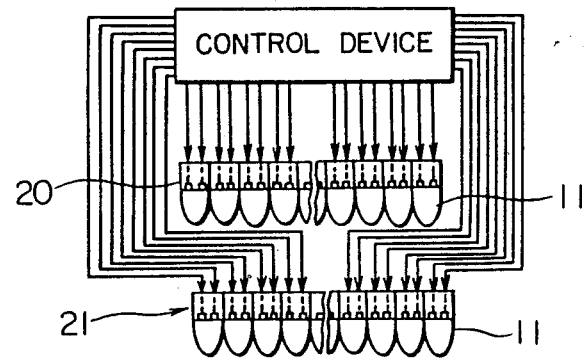
FIG. 8 is a schematic diagram showing another embodiment of the exposure means having two groups of light emission sources, FIG. 9 indicates a sectional view of the two group of light emission sources showing an arrangement of disposing them onto two parallel lines.
Figure 9:
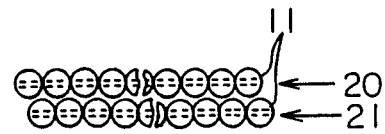

In FIG. 6, between the guide roller 4 and feed roller 5, there are provided the notch detector 6 and perforation detector 7; and between the detectors 6, 7, and the feed roller 5, as shown in FIGS. 8 and 9, there are provided the light projectors 23 and 24 at the positions shown by the symbols 23P and 24P which is comprised of the lens 20 which serves to collect the light emitted from the light emitting sources 20 and 21 in order to form an image on the film and the light emitting sources 20 and 21 wherein the light emitting subsources 11 are arranged.

As the light emitting subsources 11 of the light emitting sources 20 and 21 as shown in FIGS. 8 and 9, there are provided a multi-color LED which incorporates therein a plurality of light emitting elements having the capability of emitting the color lights such as blue, green, and red, wherein the light emitting quantity of the multi-color light emitting element of those multi-color LED can be independently regulated by means of the control device with respect to each light emitting element. Accordingly, if the film 1 is a color film, the data can be written on the film with different colors. The present invention is, however, not limited only to the embodiment disclosed herein, that is, the light emitting subsource 11 may employ the LED which does not have the capability of altering the color of the light to be emitted.

It is appreciated from FIG. 9, the light emitting sources 20 and 21 respectively have a plurality of LEDs as a light emitting subsources. The plurality of LEDs are arranged in a line crossing at right angles to the film proceeding direction. To avoid any vacant space between light spots on the film, it is preferable to dispose so the LEDs as to come in contact with each other in the line.

Further, the two groups of LEDs are juxtaposed in two parallel lines. The disposing position of LEDs on one line differ by radius of the light spot from that on another line. In other words, the deposing center of one light spot on one line does not face with that on another line in the film proceeding direction.

The control device recieves the notch detection signals and perforation detection signals, as well as the pulse signals outputted from the encoder 12 mounted with respect to the feed roller 5 in synchronization with the rotation of the feed roller 5. The control device commence the first data writing by using the light projectors 23 and 24 when the pulse count reaches the specified value, in which the pulse count is obtained by counting the output pulse from the encorder 12 upon receipt of the perforation detection signal after detecting the notch detection signal.

The aforementioned data writing process is performed in the following way: Assuming that, in FIG. 6, the distance between the image-forming positions of the light projectors 23 and 24 is P, and that the half diameter of the circle of light spot projected by the light emitting element 11 is d, then the light emitting element 11 of the light emitting source 20 is allowed to be selectively turned on in relation to the movement of the film 1 in the same manner as the light projectors of the data writing apparatus disclosed in Japan Patent Publication No. 19422/1984, and likewise the light emitting element 11 of the light emitting source 21 is allowed to be selectively turned on with the delay equivalent to the number of pulses corresponding to the film movement travel of (p−d) or (p+d) from the emission timing of the light emitting source 20. The data composed of the dots obtained by carrying out the procedures described above is, as shown in FIG. 10, so arranged that the dots formed by the light emitting source 21 overlap the vacant portions of the dot arrangement formed by the light emitting source 20, thereby eliminating the vacant portions and thus the data such as a bar code which can be mechanically read out can provide accurate information.

The control device commences the second and third data writing procedures whenever the pulse count reaches the value equivalent to the one obtained by means of adding the number of pulses equal to the one frame pitch of the film 1, and repeats the same process until the number of data writing becomes equal to the specified number of the film frames where the notch is to be formed. When the number of data writing becomes equal to the specified number of the film frames, the next data writing process is performed according to the pulse count of the encoder 12 which is obtained by means of entering the perforation detection signal after entering the notch detection signal.

The above-described process is repeatedly executed, and thus the data can be written in the subsequent film, whereby even if the notch position is slightly deviated from the perforation position, the data can be correctly written in the perforation position, or in the proper position of the film frame. The present invention is, however, not limited only to the embodiment as described above, the control device may be so constructed as to be commence the data writing process according to the pulse count which is obtained by means of counting the pulse using either one of the notch detection signal, the operation signal of the notch cutter, or the perforation detection signal as a reference.

Figure 7:
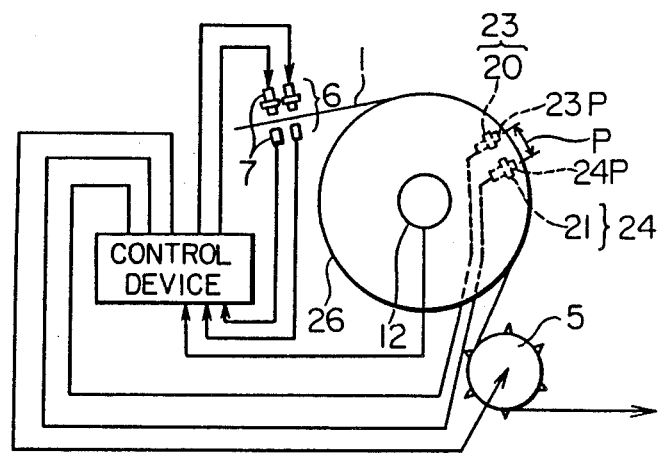

The data writing apparatus as shown in FIG. 7 is different from that as shown in FIG. 6 only in the following aspects: the data writing position roller 26 locatedc at the upstream of the feed roller 5 has a circumferential wall portion made of a transparent material at position thereon where faces with the position of the roll film 1 to be written the data; the encoder 12 is mounted with respect to the data writing position roller 26; the light emitting sources 23 and 24 for allowing the light to reach the film 1 without using a lens are incorporated in the data writing position roller 26. The light emitting source 21 at the downstream is so designed as to emit light with the timing delay equivalent to the number of pulses corresponding to the travel of the film 1 to proceed as long as the distance of (p+d) or (p−d) with respect to the distance d shown in FIG. 10 and the distance p between the positions irradiated by each light emitted from the light emitting sources 20 and 21, after the light emitting source 20 located at the upstream side is allowed to emit light in the same manner as the data writing apparatus shown in FIG. 6.

In this embodiment, it is also quite possible to write the data which does not provide the false information to the mechanical data reading system. The identical numbers found in both FIGS. 7 and 6 show the members having the same function.

As clarified above, using the data writing apparatus according to the present invention, it is possible to write the data which does not provide the false information for the mechanical data reading systgem. In addition, the data writing apparatus has the following advantages: First, the nubmer of the multi-color LED employed in the exposure means may be equal to that of the dot light projectors. Second, the data can be written in a uniform color, and the color and the shape of the data can be easily altered. Moreover, such data as has fine lines and dots can be also clearly written in the film.

The following description specifically deals with the data writing apparatus wherein neither the CPU nor software of complex processing program is required, so that the film feeding velocity and the dot density can be enhanced; and further, even if there is a slight irregularity of the film feeding velocity, its influence can be minimized.

Figure 12:
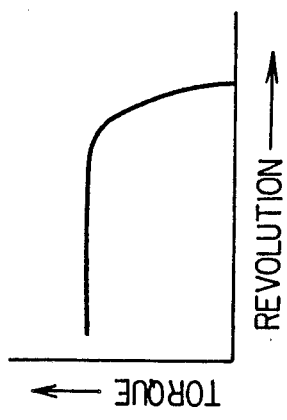

FIG. 11 schematically shows the entire construction of the apparatus. The non-exposed film 1 is guided by the guide rollers 32 and 33, and taken up by the sprocket 34, thus fed in the direction of arrow A at the specified velocity, wherein the feed holes of the film 1 mesh with the teeth 34a of the sprocket 34, and the shaft of the sprocket 34 is connected to the torque motor 35. THe torque motor 35 has the toruqe characteristics as shown in FIG. 12; therefore, by means of applying a rotation power in the opposite direction with respect to the film feeding direction, even if the film is not fed, a stable back tension is applied to the sprocket 34. Consequently, the feed holes of the film 1 mesh the teeth of the sprocket 34 at the edge thereof opposite to the film feeding direction, thus the film is securely fed by the tension exerted at the downstream.

The numeral 36 is a data input system, comprising a setting device 61 for setting the type (film speed, brand, size, etc.), data output system 62 and data compiler 63 for dealing such data as characters and symbols. The data compiled by means of the data compiler 63 is written int he memory 37 which is composed of RAM and the like. The data stored in the memory 37 is addressed by the signals from the access address generator 38 and read out, then the data is first latched by the control device 39, and when the write timing pulse reaches, the data is written int he specified portion of the film 1.

The writing portion is comprised of a group of LEDs 30 composed of a plurality of LEDs which are independently regulated by the control circuit 39, and a light guiding member 42 made of optical fiber or the like which independently guides the light from each LED to the lens 41. The end of the light guiding member 42 is so arranged to be positioned in one line, for example, with several mm pitch in the direction being right angle to the film feeding direction. The data writing process with respect to the film 1 is performed in the form of the dots arrangement when the film 1 is positioned on the sprocket 34 in synchronization with the film feeding velocity.

Numeral 43 is a rotary encoder connected to the shaft of the sprocket 34 and is so designed as to detect the rotation of the shaft of the sprocket 34. The access address generator 38 is so designed as to output the address signals using the pulse generated by the encoder 43. The control circuit 39 is also so designed as to output the light emitting command pulse (data writing timing pulse) using the output pulse emitted by the encoder 43.

Next, the operation of the apparatus is described in detail.

Figures 13A, 13B:
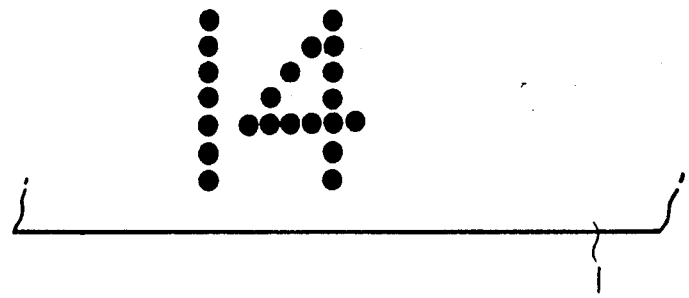
Figure 15A:
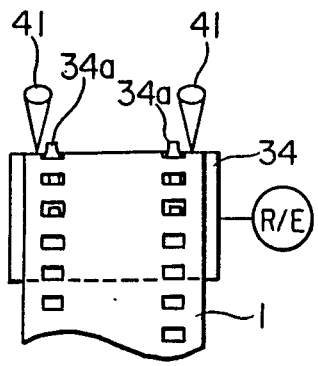
Figure 15B:
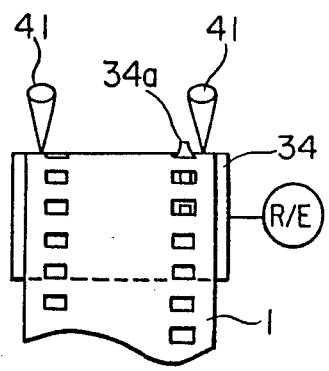
Figure 15C:
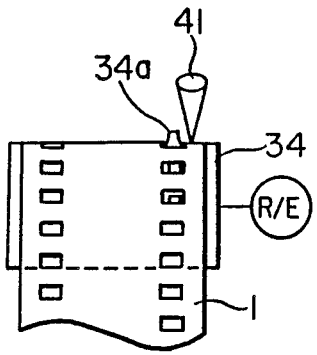
Figure 15D:
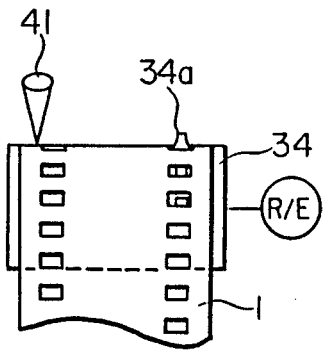

(1) Writing the memory data in the memory:

FIG. 13-a indicates a dot configuration of a numeral data "14" written on the film 1 by irradiating light spots.

FIG. 13-b represents memory data used for writing the numeral data "14" indicated in FIG. 13-a. In FIG. 13-a, data line No. corresponds to the notation number of the light emitting sources arranged in the line crossing at right angles to the film proceeding direction. Address corresponds to the position to be irradiated along the lengthwise direction of the film in order to write the data. In FIG. 13-a which represents an example in the case where only one line of light emitting sources is used, therefore, number of such position is basically obtained by dividing the length of film by the diameter of light spot.

All the memory data with respect to Data Line No. and Address are stored in the memory 37, as shown in FIG. 13, corresponding to the length of the film 1 to be written (different depending on the type; 12 frames, 24 frames, and 36 frames).

The writing positions where the data is to be written may be spaced with a given interval, or may take on several places; however, in the present example, the memory data "1" is written in the memory address corresponding to the writing position where te data is to be written, and the memory data "0" is written in the address other than described above, whereby the memory data corresponding to the over all position from the starting portion to the end portion in the lengthwise direction of the film are written in the memory 7 in the form of either "1" or "0". The memory data are written by means of the data input system 36, however, if the data input system 36 is so designed as to be detachable, then in the case of a plurality of data writing apparatuses are installed, one unit of the data input system 36 can be shared with other apparatuses.

Also, the memory data can be read out by means of counting the number of advancing travel detection pulse from the rotary encoder 43, and the address of the memory 37 is sequentially accessed from the start address number or the earlier address number per each specified pitch of the advancing travel; therefore, the CPU or software is not required for the purpose of addressing the memory 37, whereby the access address generator 38 can be comprised of the simple mechanism, and thus the reading velocity can be enhanced.

Figure 14:
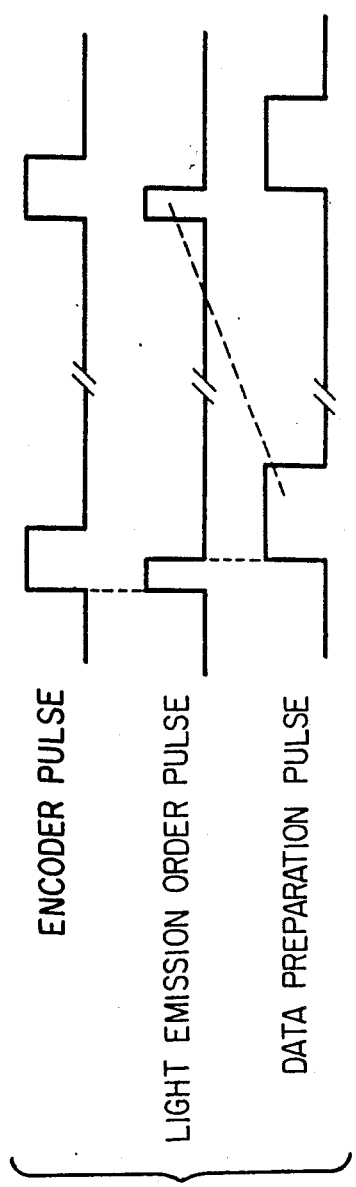
FIG. 14 is a wave form chart for explaining the operation of the control, device, FIGS. 15-a through 15-d are schematic diagrams showing data writing position on a roll film.

(2) Writing the data onto the film:

In the present embodiment, the data is written on the film in such a manner that the memory data to be written is first read out from the memory 37 and is latched in the control circuit 39, and when the write command pulse for the memory data to be written reaches, the data is written in the film. FIG. 14 shows the timing chart of the above-described procedure, wherein the data preparation pulse is used for latching the memory data read out from the memory 37 in the control circuit 39.

At the time of writing the data in the film, the specified LEDs selected from the LED group 40 emit light, and the light is collected by means of the lens 41 through the light guding member 42, and then the light irradiates the film 1 positioned on the sprocket 34, whereby the irradiated portion is exposed. In this case, when all the bit information of the memory data is "0", even if the write command pulse reaches, the data is not actually written in the film. Thus, the data is written in the film 1 in the form of the dot image. The latent image formed by the exposure is developed when the user of the film ask the film to be developed and the development is thus executed.

As described above, since the memory data to be written is prepared in advance, the time to be required for writing the data is not affected by the time required for reading the memory data from the memory 37; accordingly, even if the film feeding velocity is greatly enhanced, no problem occurs, thus the position to be written is accurately controlled.

In the event that the data writing is carried out on he sprocket 34, there are following embodiments of writing data according to the invention: First, as shown in FIG. 15-a, the teeth 34a are formed on both sides of the roller, and the data is written in the film at the portion outside of the teeth 34a on both sides. Second, as shown in FIG. 15-b, the teeth is formed only on one side of the roller, and the data is written at the both sides of the film in such a manner as in the first case. Third, as shown in FIG. 15-c, the teeth 34a are formed only on the side of the roller, and the data is written in the film only on one side where the teeth 34a are provided. Fourth, as shown in FIG. 15-d, the teeth 34a are formed only on the side of the roller, and the data is written in the film only on the side where the teeth 34a are not provided.

(3) Compensating the surging of the film feeding

If the feeding velocity of the film 1 surges, the position where the data is to be written surges as well, whereby the possibility occurs that a part of the data in the form of the dot may be doubly written. To avoid this kind of disadvantage, in the present invention, the output timing of the light emitting command pulse in the control circuit 39 is so designed as to be delayed, in the case for example the film feeding direction is reversed, to the extent that the film feeding velocity restores its original velocity in the original feeding direction.

Figure 16:
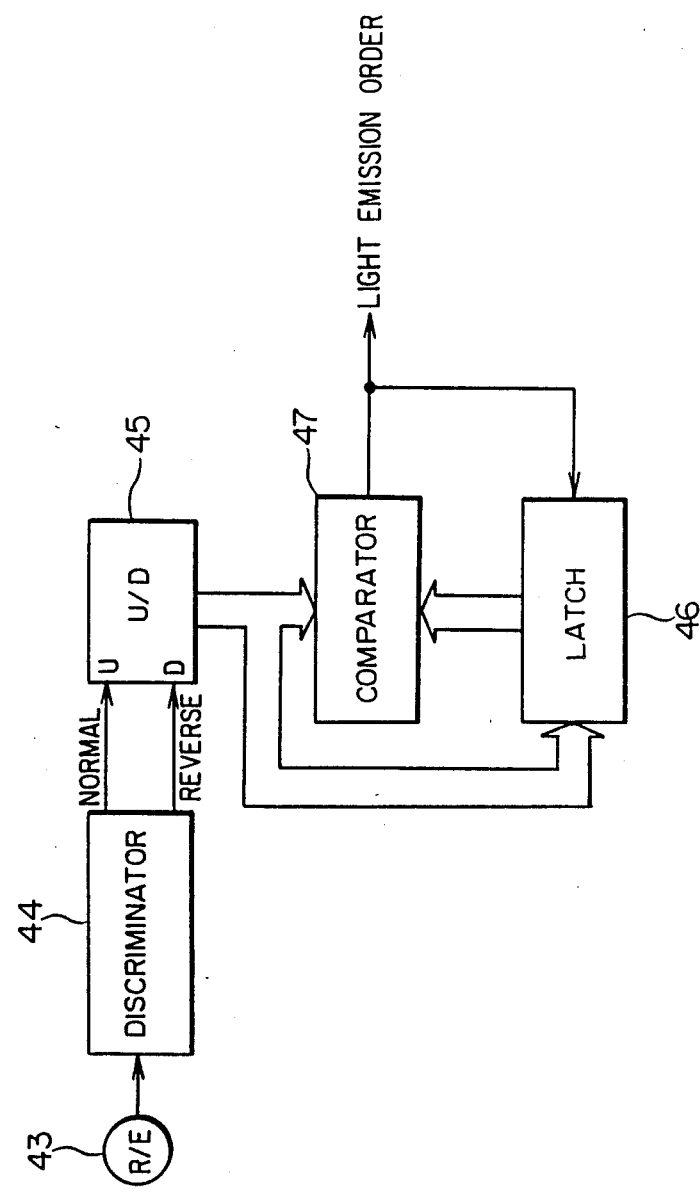
FIGS. 16 and 17 are schematic block diagrams showing doubly writing prevention circuits.

FIG. 16 is an block diagram showing the exmaple of the case described above. In this example, the output pulse (two-phase pulse) from the rotary encoder 43 is judged by the discriminator 44 for judging the rotation direction, and the forward rotation pulse showing the forward rotation (film feeding direction (A) is inputted into the up terminal U of the up/down counter 45, and the backward pulse showing the backward rotation is inputted into the down terminal D of the abovementioned counter 45; and then the current output of the counter 45 and the preceding output of the counter 45 latched by the latch 46 are compared with each other, wherein only in the case the current output from the counter 45 is greater than the preceding output from the latch 46, the light emitting command pulse is outputted and, at the same time, the contents of the latch 46 can be updated to the current output of the counter 45 at that moment.

Consequently, always a large count value (maximum value) is latched by the latch 46, whereby, for exmaple, when the sprocket rotates in he backward direction, the counter 45 counts downwardly in order to lower the count output, thus the light emitting command pulse is not outputted from the comparator 47, and the sprocket 34 rotates in the forward direction, so that the light emitting command pulse is outputted only when the count value of the counter 45 exceeds the value previously latched by the latch 46. In other words, the light emitting command pulse is outputted only when the film 1 is fed correctly in the forward direction to the extent of the specified pitch.

Figure 17:
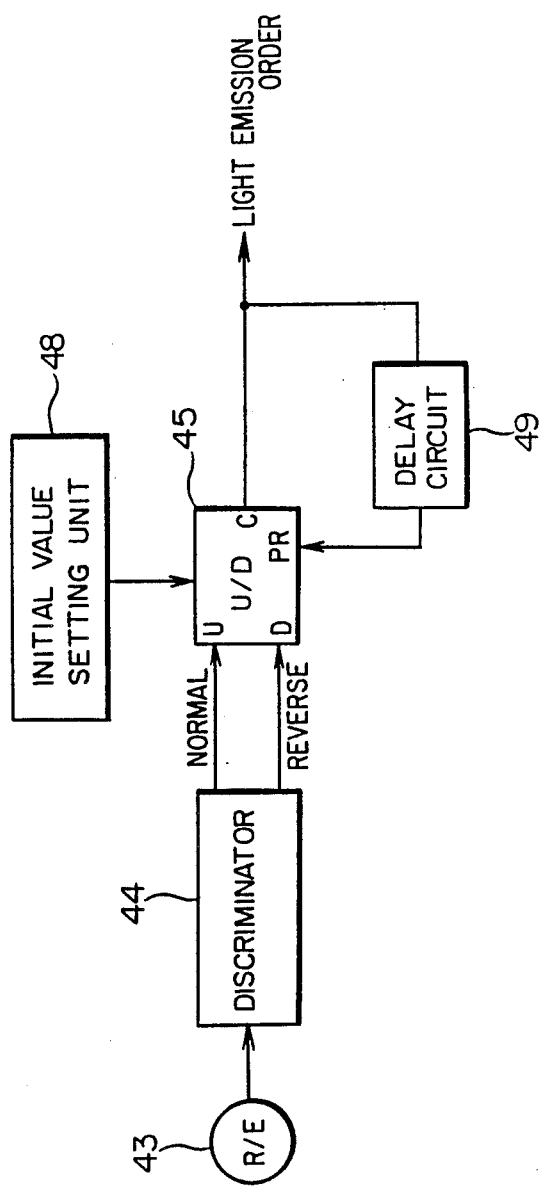

FIG. 17 is a block diagram showing another example. In this example, the initial value is preset to the up/-down counter 45 through the initial value setting device 48, and the light emitting command pulse is outputted when the count of the counter 45 is overflowed from a countable range, and at the same time, the counter 45 is reset to the initial value through the delay circuit 49 serving as a reset circuit.

Accordingly, if the counter 45 is so preset as to overflow at the value of "10", and the initial value is set to the value of "8" using the initial value setting device 48, when the sprocket 34 keeps on rotating in the forward direction, the light emitting command pulse is outputted whenever the counter 45 performs the upcount two times. If the sprocket 34 rotates in he backward direction, the counter 45 counts downwardly, therefore, the light emitting command pulse is outputted if thereafter the sprocket rotates in the forward direction to recover the original position and further rotates in the same direction to the extent equivalent to "2" counts.

Figure 18:
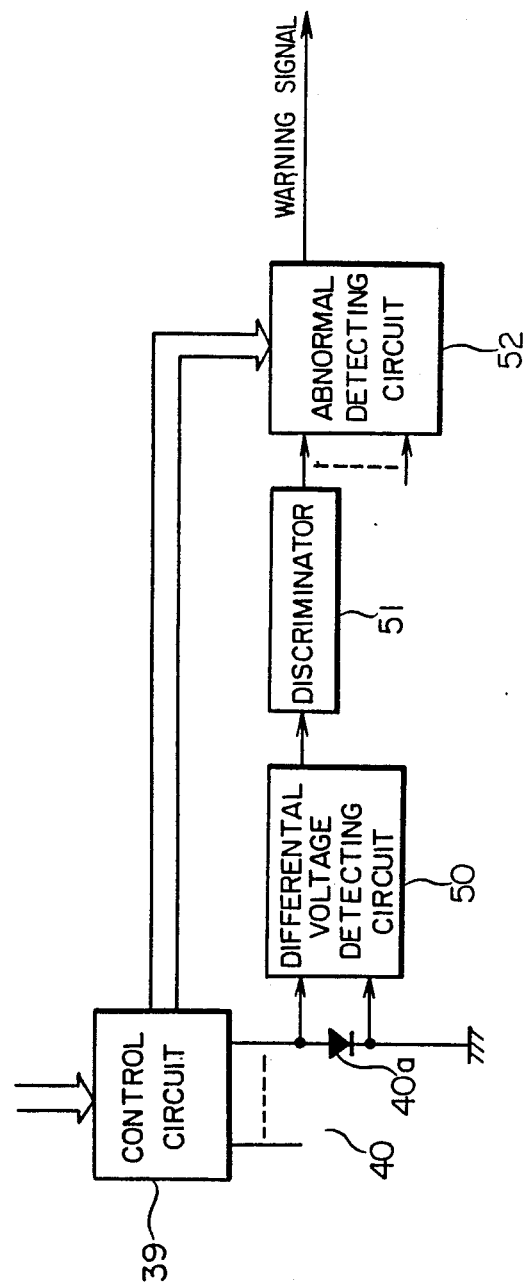
FIG. 18 is a schematic block diagram showing an abnormal detecting circuit.

In this case, the carrying-up output of the counter 45 is to be utilized, however, the carrying-down output can be utilized as well. In such a case, the forward rotation pulse and backward rotation pulse of the forward/backward detection circuit 44 may be inputted in reverse into the terminals U and D of the counter 45. In this case, for example, if the initial value of the counter 45 has been t to "1" by means of the initial value setting device 48, likewise in the case described above, the light emitting command pulse will be outputted whenever as many as two counts have been counted downwardly (4) Controlling the LED:

WHen the data is being written, even if some LEDs of the LED group 40 are broken due to the open or short circuit, it is impossible to check if the data is correctly written in the film; therefore, the LEDs have to be always monitored. In the conventional apparatus, such kind of monitoring function has been performed by utilizing the current passing through the LED, however, there have been various problems. To solve such problems, in the present embodiment, as shown in FIG. 18, the voltage at both ends of each LED 40a is independently detected by means of the between-terminals-voltage detection circuit 50. The voltage thus obtained is jduged by means of the judging circuit 51 if the value conforms to the specified value (when the LED is energeized, the specified normal voltage ranges from 1.8 to 2.0 V). The judgment signal is then inputted into the abnormality detection circuit 52 and is compared with the turning on/off controlling information of the LEDs. In this stage, if the turn-off signal is obtained from the judging circuit 51 regarding the LED which has to be turned on, or if the turn-on signal is obtained regarding the LED which as to be turned off, then an alarm signal is outputted. The alarm signal serves not only as a signal showing the abnormality of the LED but also as a signal showing the abnormality of the selection operation of the LED group 40.

Incidentally, in the embodiment indicated in FIG. 11, there is provided only one line of light emitting sources, however, it is also possible to incorporate two lines of light emitting sources as shown in FIG. 9 into the above embodiment of FIG. 11.

Figure 10:
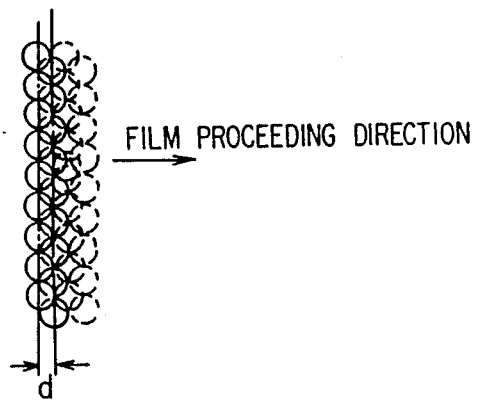
FIG. 10 is an explanatory diagram showing light spots on the roll film irradiated by the light emission sources as shown in FIG. 9.

In the embodiment of using two lines of light emission sources, it is necessary to take into account the positional relation between light spots in order to superpose them. In FIG. 6, now assuming that, when two groups of light emission sources 20 and 21 simultaneously irradiate light spots having the radius (d) while moving the film, the distance in the film processing direction between the center lines of the two spotted lines is (2×d). In order to superpose the half circle of the one spotted line onto another spotted line as shown in FIG. 10, wherein the distance between the center lines is (d), firstly the control device allow the light emission sources 20 to irradiate the first spotted line at upstream side. And then, after the first spotted line proceeds to downstream side by the travel (d), the light emission sources 21 is allowed to irradiate the second spotted line onto the first spotted line, thereby superposing the second spotted line onto the fore part of the first spotted line by the half circle.

In FIG. 10, assuming that the spotted lines are nominated Line No. 0, 1, 2 and 3 from the leading line in the film proceeding direction, Line Nos. 1 and 3 are to be irradiated by the light emission sources 20 and Line No. 0 and 2 are to be irradiated by the light emission sources 21. As explained above, firstly the control device allow the light emission sources 20 to irradiate Line No. 1 at upstream side, then the light emission sources 21 is allowed to irradiate Line No. 0 to be superposed onto the fore part of Line No. 1, and then light emission sources 20 is allowed to irradiate Line No. 3, thereafter the light emission sources 21 is allowed to irradiate Line No. 2 to be superposed onto both the fore part of Line No. 3 and the rear part of Line No. 1. The control device detects the film movement from the encoder pulse. When judging the film movement equal to the travel (d), the control device allows the light emission sources 20 and 21 to irradiate in above order.

In order to let the light emission sources 20 and 21 irradiate in above order, it can be attained by storing the data of above lines in the memory 37 in FIG. 11 in the order of Line No. 1, 0, 3, 2 and the like. However, it may be complicate to separate the data into such order.

Therefore, it may be preferable that the data of above lines are stored in the order of Line No. 0, 1, 2, 3 and the like and then the memory is addressed in the order of address No. 1, 0, 3, 2 and the like.

For the purpose of this addressing manner, in the access address generator 38, there is provided a binary counter having the predetermined numbers of bits. Further, among address lines between the binary counter and the memory, on the address line of LSB (least significant bit) there is provided a inverter for inverting the output signal from the LSB, thereby addressing 1, 0, 3, 2, 5, 4, 7, 6 and the like in the order.

In the control circuit 39, there is provided two sets of latch circuits which are respectively used for the two lines of light emission sources 20 and 21. By detecting from the state of LSB whether the current address is odd number or even number, the read out data is transmitted to either one of such latch circuits. The data of odd number address are written at upstream side by the light emission sources 20 and the data of even number address are written at downstream side by the light emission sources 21. In this embodiment of using two lines of light emission sources, the writting interval becomes two times faster than that of using only one line of light emission sources.

As described above, the data writing apparatus according to the present invention is so constructed as to be equipped with a memory whereby all the data corresponding to the data writing line from the starting portion to the end portion of the film can be stored in such a manner that the data can be sequentially read out from the memory in sycnhronization with the feeding operation of the film. Hence, the data can be read out without the aid of the CPU and software and the like, thereby enhancing the reading speed. Accordingly, enhancement of both writing speed of the data and the dot density become possible; besides, the influence of the irregularity of the film feeding velocity is eliminated. Moreover, if the data input system is so constructed as to be detanchable, then other data writing apparatuses can commonly use the system which is a very expensive one, thus eliminating the construction cost to a great extent.

The embodiment described above shows the case wherein the present invention is applied the roll film; however the present invention is not necessarily limited to the roll film only, but can be applied to the disc film as well.

Figure 19:
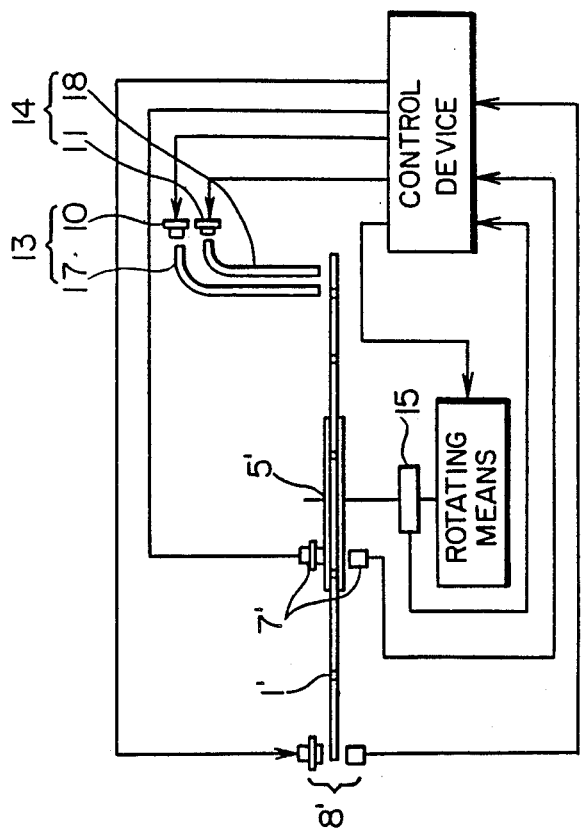
FIG. 19 is a structural illustration of a data writing apparatus for optically writing data onto a disk film according to the invention.

In the data writing apparatus as shown in FIG. 19, the data is written in the following manner: The disk film 101 is mounted on the rotation shaft 105 which is controlled and rotated by the control device, and both the square hole detection signal from the square hole detector 107 comprising a light emitting device and a light receiving device and mounted on the core portion of the disk film 101, and the notch detection signal from the notch detector 8' comprising a light emitting device and a light receiving device mounted on the periphery of the disk film 101 in such a manner as to correspond to the film frame position, are utilized by the control device in the same manner as the notch detection signal and the perforation detection signal in the aforementioned embodiment, and the pulses outputted by the encoder 115 in synchronization with the rotation of the rotation shaft 105 are counted, thus the data is written in the film with the aid of the light emitting portions 113 and 114 in the same manner as in the case of the data writing apparatus as shown in FIG. 6.

The light emitting portions 113 and 114 are comprised of the light projectors 110 and 111 and the optical fibers 117 and 118 for guding the light from the light emitting device 109, and the light-outgoing end portion of the optical fibers 117 and 118 of the light projectors 113 and 114 are so arranged as to be positioned in the radial direction of the film 101 wherein each arrangement is deviated from each other to the extent indicated by d as shown in FIG. 10 with those two lines so arranged as to be positioned in the circumferential direction. In this data writing apparatus, if the dots are written by the light emitted fromthe light-outgoing portions of the farthest outside optical fibers 117 and 118 in such an arrangement as shown in FIG. 10, then no vacant portion is generated in the written data.

Further, the data stored in he memory can be read out, in the same manner as in the case shown in the case shown in FIG. 11, by means of using the output of the encoder.

What is claimed is:

1. An apparatus for optically writing data as a latent image on film coated with a photosensitive material while the film is moving in a predetermined direction, the apparatus comprising:

exposure means comprising a light emitting source including a plurality of multicolor LED's, each of said plural multicolor LED's having a plurality of light emitting elements, each of said light emitting elements capable of emitting a specific color light; and control means for selecting light emitting elements of said multicolor LED to be illuminted in accordance with the data to be written.

2. The apparatus of claim 1, wherein said plural multicolor LED's are arranged substantially in a line being substantially perpendicular to the predetermined direction in which the film is moving.

3. The apparatus of claim 1, wherein said control means controls the intensity of light emitted from each of said plurality of light emitting elements.

* * * * *